Nov. 2, 1943.    A. J. WEATHERHEAD, JR    2,333,350

HOSE COUPLING

Filed Aug. 22, 1942

INVENTOR.
ALBERT J. WEATHERHEAD, JR.

BY
Bosworth + Sessions

ATTORNEYS

Patented Nov. 2, 1943

2,333,350

UNITED STATES PATENT OFFICE 2,333,350

HOSE COUPLING

Albert J. Weatherhead, Jr., Shaker Heights, Ohio, assignor to The Weatherhead Company, Cleveland, Ohio, a corporation of Ohio Application August 22, 1942, Serial No. 455,795

3 Claims. (Cl. 285—84)

This invention relates to hose couplings and more particularly to hose couplings of the type which can be secured to the ends of non-metallic flexible hoses by means of hand tools in the field.

One hose coupling of this type, which has been used with considerable success in the flexible fluid lines of modern aircraft, comprises a coupling body having a sleeve portion adapted to surround the end of a hose and having the body portion threaded to receive a nipple which projects within the bore of the hose, the material of the hose being clamped securely between the external surface of the nipple and the internal surface of the sleeve. The nipples are ordinarily provided with means, such as an annular sealing surface, for connecting them to another fluid conduit. The sealing surface of the nipple can be clamped against another sealing surface by means of a coupling nut swiveled on the nipple.

A coupling of this type is assembled with a hose by first inserting the hose end into the sleeve and then screwing the nipple into the body of the fitting and the bore of the hose. In some instances it may be desirable to use a rod extending through the nipple and into the bore of the hose, to avoid scuffing the inner bore of the hose by the thin edge of the nipple. While such devices make very good connections with the hose, there has been some difficulty in assembling such couplings, for either a special tool must be employed to engage the nipple, or the internal bore of the nipple must be shaped to receive a wrench. Neither method of assembly is satisfactory for the special tool may be misplaced just when it is needed the most, and with an internal wrench receiving surface, the sealing surface of the nipple is apt to be marred or distorted thus impairing the efficiency of the seal. Accordingly, a general object of the present invention is to provide a coupling in which these difficulties are overcome, and which can be secured to a hose without requiring any special tools and without danger of damaging the nipple.

Figure 1:
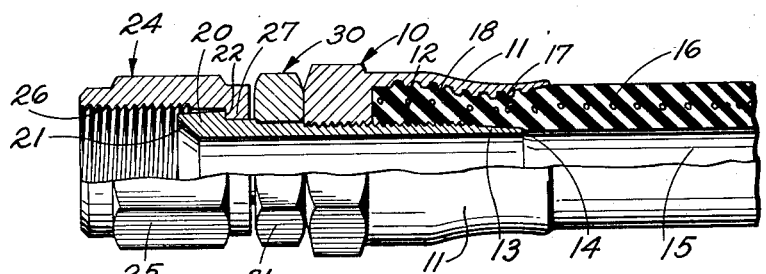
Figure 2:
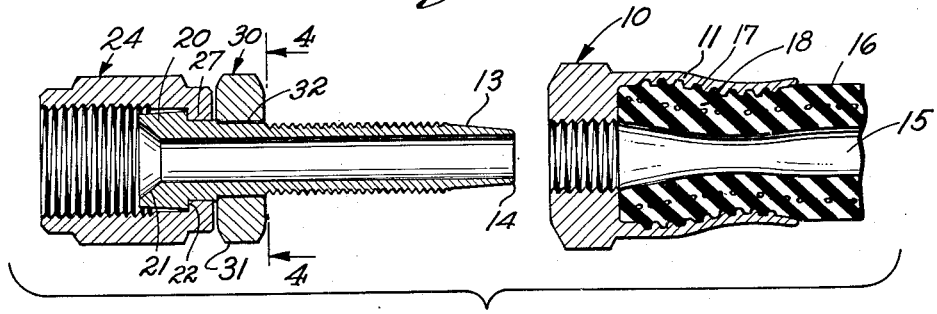
Figure 3:
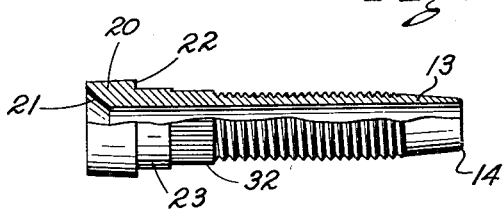
Figure 4:
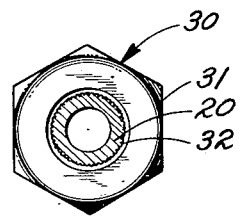

A preferred form of my invention is illustrated in the accompanying drawing wherein Figure 1 is a view partially in section of an assembled coupling and hose embodying the present invention; Figure 2 is a cross-sectional view showing the parts of the coupling of Figure 1 before assembly; Figure 3 is an illustration, partially in section, showing the nipple; and Figure 4 is a section as indicated by the line 4—4 of Figure 2.

As shown in Figure 1, a preferred form of a coupling embodying my invention may comprise a coupling body indicated generally at 10 and having a hose engaging sleeve 11 projecting therefrom. The body is provided with an internally threaded bore 12 which receives the externally threaded nipple 13, the end of the nipple tapering to a thin edge as at 14 and the arrangement being such that when the nipple is screwed into the threaded bore 12 and into the bore 15 of the hose 16, the hose will be expanded by the nipple and the material of the hose compressed against the inner surface of the sleeve 11 with considerable force.

Preferably the sleeve 11 is shaped as substantially shown in the drawing and is provided with coarse threads 17 in order to facilitate the entry of the hose end into the sleeve and to give the sleeve a secure grip on the material of the hose. It will be noted that the expansion of the material of the hose adjacent the end thereof as in the zone indicated at 18 furnishes a key which effectively prevents the hose from being forced out of the coupling by the internal fluid pressure or by mechanical forces. While this particular construction is preferred, it is to be understood that my present invention may be utilized with hose couplings of different types embodying different means for insuring a secure connection between hose and coupling.

In order to make a connection between the hose and another fluid conduit, the end of the nipple away from the hose may be provided with an enlarged portion 20 having an annular sealing surface 21 thereon. The enlarged end 20 terminates in a shoulder 22 and the nipple is preferably provided with a cylindrical portion 23 adjacent the shoulder 22. In order to clamp the conical sealing surface 21 into engagement with a corresponding mating surface (not shown) a coupling nut 24 preferably is employed. This nut, which has a hexagonal or other angular surface as indicated at 25, is internally threaded as at 26 for engagement with another instrumentality and is provided with an inwardly extending flange 27 so that the nut is swiveled on the cylindrical portion 23 and held against end-wise displacement by the shoulder 22.

To provide a convenient means whereby the nipple can be rotated to insert it into position in the body of the coupling and the bore of the hose without requiring any special tools or equipment and without danger of damaging the nipple or the sealing surfaces thereof, I preferably employ the nut or wrench engaging member 30 which preferably has external angular surfaces 31 adapted to be engaged by a wrench or similar tool and preferably of the same peripheral size and shape as the coupling nut 24. The nut 30 is keyed to the nipple 13 so that when the nut is turned as by a wrench, the nipple will be turned with it.

The keying or securing of the nut 30 to the nipple may be advantageously accomplished by the arrangement shown particularly in Figures 3 and 4. As illustrated therein, the nipple is provided with a portion 32 adjacent the cylindrical portion 23, the portion 32 being formed with axial splines or serrations which can be produced by a broaching operation but which preferably are formed by the use of a coarse straight knurl. It will be noted that the diameter of the knurled portion 23 is slightly greater than the diameter of the threaded portion so that the nut 30 can be slipped over the threaded portion and into engagement with the knurled portion. In order to secure the nut against rotation of the nipple the nut may be provided with internal splines or serrations corresponding to the external splines or serrations on the portion 32. This may be accomplished by a broaching operation if desired, but ordinarily it is necessary only to provide the nut with a straight cylindrical bore of the proper size, and press it on to the knurled portion 32, the knurled portion 32 cutting or forming the corresponding splines or serrations in the internal cylindrical bore of the nut. This method is extremely economical and provides a secure and strong joint. The method is especially suited where the nipple is composed of a relatively hard or strong metal such as steel and the nut composed of a softer metal such as aluminum. These materials are desirable in the manufacture of couplings for use on aircraft, the steel nipple being preferred because of the strength obtainable and the aluminum parts for lightness of weight.

In producing a coupling embodying my invention, the coupling nut 24 is first slipped on to the nipple 13 with the flange 27 engaging the cylindrical portion 23, and then the nut 30 is pressed onto the knurled portion 32, thus not only securing the nut 30 in place, but preventing the loss of the coupling nut 24.

In order to assemble a hose with a coupling made according to my invention, the hose end is first screwed into the sleeve 11 as shown in Figure 2 of the drawing, then the nipple 13 is screwed into the bore 12 of the coupling body and the bore 15 of the hose. This operation may be accomplished by using two wrenches, one to hold the body portion and the other to turn the nut, or by using a vise and a wrench. Inasmuch as the surfaces of the coupling nut 24 and the wrench engaging member or nut 30 are preferably of the same size and shape, the coupling nut 24 does not interfere with the use of the wrenches, and the whole assembly operation can be carried out rapidly and easily without requiring any particular skill or any special tools or equipment. Inasmuch as the turning forces necessary to screw the nipple into the bore of the hose are applied to the nut 30, there is no danger of marring or distorting the sealing surface of the nipple.

In the foregoing specification I have described a preferred form of my invention as applied to one particular type of coupling. Those skilled in the art will appreciate that various changes and modifications may be made therein without departing from the spirit and scope of my invention, and that my invention may be adapted to couplings of various types. Accordingly it is to be understood that my patent is not limited to the preferred form described herein, or in any manner other than by the appended claims when given the range of equivalence to which my patent may be entitled.

I claim:

1. In a device of the character described, a nipple having an end portion adapted to be screwed into a hose coupling and the bore of a hose, the other end of the nipple being enlarged and providing a sealing surface for connecting said nipple to another fluid conduit, a coupling nut swiveled on said nipple adjacent said enlarged end, said coupling nut having an inwardly extending flange of lesser diameter than said enlarged end, said nipple having a knurled surface adjacent the zone of engagement of said coupling nut therewith, and a wrench engaging member having a peripheral shape substantially identical with that of the coupling nut and pressed onto the knurled portion of said nipple, the flange of said coupling nut being disposed between said enlarged end and said wrench engaging member, whereby said coupling nut is secured in position on said nipple.

2. In a device of the character described, a nipple having one end adapted to be screwed into the bore of a hose, the other end of the nipple being enlarged and providing a sealing surface for connecting said nipple to another fluid conduit, a coupling nut swiveled on said nipple adjacent said enlarged end, said coupling nut having a hollow threaded portion surrounding said enlarged end and an inwardly extending flange of lesser diameter than said enlarged end, said nipple having a knurled surface adjacent the zone of engagment of said coupling nut therewith, and a wrench engaging member pressed onto the knurled portion of said nipple, said flange being disposed between said wrench engaging member and said enlarged end, whereby said coupling nut is secured in position on said nipple.

3. A coupling comprising a body member having a sleeve adapted to surround the end of a hose, a nipple threaded in the body and having an end adapted to enter the bore of a hose and compress the same against said sleeve, the other end of said nipple having a shoulder and an enlarged end portion provided with means for making connection with another fluid conduit, a coupling nut swiveled on said nipple and having an inwardly extending flange engaging said shoulder and of lesser diameter than said enlarged end portion, and a separately formed member having a wrench engaging surface, keyed to said nipple and disposed thereon adjacent said nut, said coupling nut being retained in position by said separately formed member and said shoulder.

ALBERT J. WEATHERHEAD, Jr.